PHASE-SHIFT SINGLE SIDE-BAND MODULATORS

Filed Nov. 27, 1961

PRIOR ART

United States Patent Office 3,225,316

Patented Dec. 21, 1965

3,225,316

PHASE-SHIFT SINGLE SIDE-BAND MODULATORS

Wolja Saraga, Orpington, Kent, England, assignor to Associated Electrical Industries Limited, London, England, a British company Filed Nov. 27, 1961, Ser. No. 155,049
Claims priority, application Great Britain, Dec. 2, 1960, 41,574/60
6 Claims. (Cl. 332—45)

This invention relates to modulation circuit arrangements for frequency translating A.C. signals, and in particular to such arrangements which employ the so-called phase-shift method of single side-band generation.

An A.C. signal to be frequency translated by a modulation circuit arrangement is usually a relatively wide-band signal made up of, and able to be represented as the sum of, a plurality of different frequency components (e.g. audio frequency components of speech) each having its individual amplitude, frequency and phase angle. It is therefore strictly speaking not correct to refer to the amplitude, frequency or phase of the signal as a whole. However, in the arrangements with which the present invention is concerned the phase and amplitude relations of these individual frequency components are of importance so that in using strictly accurate terminology it would be necessary to refer every time to the phase and amplitude of each frequency component individually. Therefore, in order to simplify the description, the phase, frequency and amplitude of the A.C. signal will in certain circumstances be referred to as if the signal contained only a single frequency component. It will however be understood that the actual signal may contain any arbitrary numbers of such individual frequency components within a specified band. This simplification is justified since in a modulation process involving an A.C. signal and a carrier oscillation, each frequency component of the A.C. signal is, in effect, individually modulating the carrier oscillation. Also, a carrier oscillation as considered hereinafter is referred to as being a single frequency oscillation. However, it is to be understood that in practice the carrier oscillation may well contain other frequency components, for instance harmonic components of the fundamental carrier frequency, and the term carrier oscillation is therefore to be construed accordingly.

Basically, the generation of a single side-band signal by the phase-shift method has hitherto involved two separate, simultaneous, modulation processes with subsequent additive or subtractive combination of the modulation products in order to produce a resultant signal corresponding to their sum or difference as may be required. Combining circuits effecting such additive or subtractive combination are well known, being for instance, series or parallel arrangements according to how the modulation products are to be combined on a current or voltage basis, or possibly hybrid transformers, or summing amplifiers of the analogous computing type. For example, consider the phase-shift method of single side-band generation as employed in a presently known kind of phase-shift modulation arrangement such as may be used in carrier communication systems: in this modulation arrangement an A.C. signal to be frequency translated is applied in two different phases to respective matched modulators and is modulated therein with a carrier oscillation also applied to the two modulators in different respective phases. The modulation product of each modulator contains both upper and lower side-band signals having frequency components symmetrically spaced about the frequency of the carrier oscillation and, ideally, the upper and lower side-band signals produced by one modulator have components which have identical frequencies with those produced by the other modulator. However, the amplitudes of, and the phase difference between, the two phase-displaced A.C. signals on the one hand and the amplitudes of, and the phase difference between, the two phase-displaced carrier oscillations on the other hand are appropriately related to each other such that the corresponding side-band signals in the two modulation products are of such relative phase with respect to each other that additive or subtractive combination of the two modulation products in a combining circuit results in cancellation of one side-band signal, which is therefore suppressed, and reinforcement of the other. The factors determining this appropriate relationship between the amplitude and phase differences of the A.C. signals and of the carrier oscillations are well known. In practice it is usually desirable for the two A.C. signals, and likewise the two carrier oscillations, to be in phase quadrature, that is, to have a 90° phase difference but, subject to certain exceptions, departure from this in-quadrature phase relationship between the two A.C. signals can be compensated for by appropriately modifying the amplitude of, and the phase difference between, the two carrier oscillations, or vice versa. An example of this is given later in the specification.

It will be evident from the foregoing that with the prior modulation arrangements employing the phase-shift method the efficiency of the suppression of the unwanted side-band signal depends on the accuracy of the amplitude and phase relationships of the frequency components in the modulation products of the two modulators: therefore precision design and adjustment, and also long-term stability, is required for the two matched modulators, as well as for the two phase-shift networks.

The present invention provides a novel modulation arrangement employing the phase-shift method which avoids the use of two matched modulators.

According to the invention a modulation arrangement employing the phase-shift method comprises two combining circuits arranged to have applied thereto in different respective phases of an A.C. signal to be frequency translated and for combining this signal (additively or subtractively as may be required) with a carrier oscillation also to be applied to the two combining circuits in different respective phases, together with a single multiplying circuit for multiplying together the resultant combination signals from said combining circuits, the amplitudes of and the phase difference between the two phase-displaced A.C. signals on the one hand and the amplitudes of and the phase difference between the two phase-displaced carrier oscillations on the other hand, having a relationship corresponding to that appropriate for the production of a single (upper or lower) side-band signal by the phase-shift method, such signal being included in the output obtained from the multiplying circuit.

The nature of the invention may be better understood from the following description given in conjunction with the accompanying drawing in which.

Figure 1:
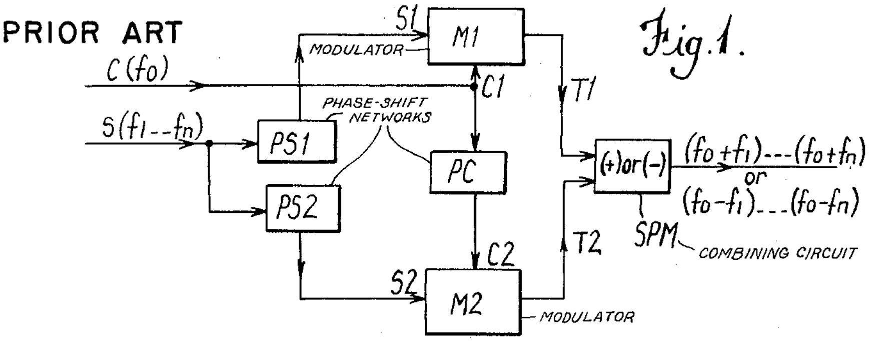
FIG. 1 is a block diagram of a presently known modulation arrangement employing the phase-shift method.

Referring to FIG. 1, the modulation arrangement there shown comprises three phase-shift networks PS1, PS2 and PC, two modulations M1 and M2, and a combining circuit SPM. An A.C. signal S containing frequency components $f_1 \ldots f_n$ is simultaneously applied to the two phase-shift networks PS1 and PS2 which in response thereto respectively produce corresponding phase-shifted output signals S1 and S2. Assuming that the networks PS1 and PS2 are so designed that all the frequency components of the signals S1 and S2 are approximately in quadrature, then if the signal S is represented in usual manner by:

$$S=\sum_{k=1}^{k=n} a_k \cos(\omega_k t+\beta_k)$$

$$S1=\sum_{k=1}^{k=n} a_k \cos(\omega_k t+\beta_k+\gamma_k)$$

and $$S2=\sum_{k=1}^{k=n} a_k \cos\left(\omega_k t+\beta_k+\gamma_k-\frac{\pi}{2}\right)$$

$$=\sum_{k=1}^{k=n} a_k \sin(\omega_k t+\beta_k+\gamma_k)$$

where $\omega_k=2\pi f$ ($f$ being each individual frequency component of the signal S). $\beta_k$ represents the instantaneous phase of each frequency component and $\gamma_k$ and $$\left(\gamma_k-\frac{\pi}{2}\right)$$

are the phase changes imposed on the signal S by the networks PS1 and PS2 respectively.

The signal S1 is applied to the modulator M1 together with a carrier oscillation C of single frequency $f_0$, and the signal S2 is applied to the other modulator M2 together with a carrier oscillation C2 as produced by the phase-shift network PC, where $$C=C1=C_0 \sin \omega_0 t$$

and $$C2=C_0 \cos \omega_0 t$$

that is, the carrier oscillation C2 has the same frequency and amplitude as the carrier oscillation C1, but is in quadrature with it.

If it is assumed that the modulators M1 and M2 are simple multipliers then the output from each will be proportional to the product of the applied signal (S1 or S2) and the carrier oscillation (C1 or C2). (In practice further "higher-order" products are generated.)

Thus, neglecting proportionality constants, the output signal (T1) from the modulator M1 will be:

$$T1=S1C1=C_0\sum_{k=1}^{k=n} \tfrac{1}{2}a_k \{\sin[(\omega_0+\omega_k)t+\beta_k+\gamma_k]+ \sin[(\omega_0-\omega_k)t-\beta_k-\gamma_k]\}$$

and the output signal (T2) from the modulator M2 will be:

$$T2=S2C2=C_0\sum_{k=1}^{k=n} \tfrac{1}{2}a_k \{\sin[(\omega_0+\omega_k)t+\beta_k+\gamma_k]- \sin[(\omega_0-\omega_k)t-\beta_k-\gamma_k]\}$$

It will be seen from these two equations that both output signals T1 and T2 contain both side-bands. However, the upper side-bands occur in T1 and T2 in phase, whereas the lower side-bands occur in phase opposition. Therefore the sum of the output signals T1 and T2 contains only the upper side-band having frequency components $(f_0+f_1) \ldots (f_0+f_m)$ and the difference contains only the lower side-band having frequency components $(f_0-f_1) \ldots (f_0-f_n)$, so that a single side-band resultant output signal can be obtained by additively or subtractively combining the output signals T1 and T2 in the combining circuit SPM.

It will be appreciated from the foregoing that the lower side-band may be represented by the expression $$(S1C1-S2C2)$$

and the upper side-band may be represented by the expression $(S1C1+S2C2)$. Accordingly, other equations to be considered hereinafter which involve the signals and carrier oscillations C1, S1, C2 and S2 will be expressed in similar fashion in instances where it is thought unnecessary to repeat their cosine and sine functions.

Figure 2:
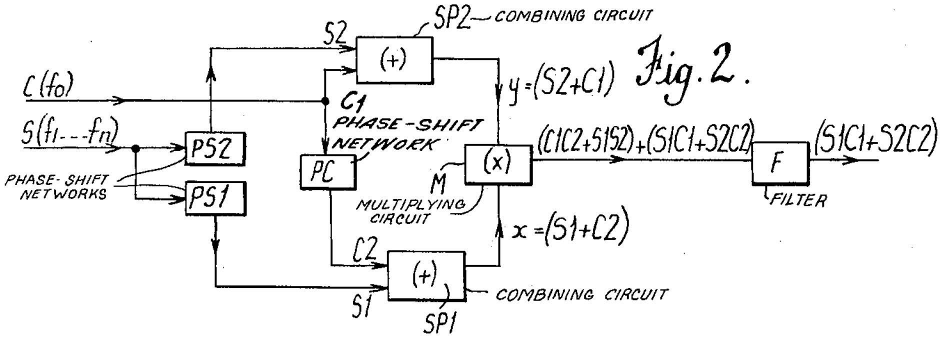
FIG. 2 is a block diagram of a modulation arrangement embodying the invention.

In the modulation arrangement embodying the invention shown in FIG. 2, the signal S is simultaneously applied, as before, to two phase-shift networks PS1 and PS2. However, in this instance, the output signal S1 produced by the network PS1 is applied to a combining circuit SP1 wherein it is combined with the carrier oscillation C2, the circuit SP1 providing a resultant combination signal proportional to $(S1+C2)$. Similarly, the output signal S2 produced by the network PS2 is applied to a combining circuit SP2 wherein it is combined with the carrier oscillation C1, the circuit SP2 providing a resultant combination signal proportional to $(S2+C1)$. The two resultant signals $(S1+C2)$ and $(S2+C1)$ are applied to a signal multiplying circuit M which, in order to carry the invention into effect, is required to be substantially a pure multiplier; that is, the circuit M is required to function in such manner that in response to applied input signals $x$ and $y$ it produces an output signal $z=kxy$ (where $k$ is a multiplying constant of the circuit), with this output signal remaining unchanged if the input signals $x$ and $y$ are interchanged with regard to their points of application to the circuit. A multiplying circuit which satisfies this requirement may be termed a "symmetrical multiplier," such a circuit being shown in FIG. 3, and also in FIG. 4, both of which will be considered presently.

The required output signal from the circuit M is $S1C1+S2C2$ (upper side-band) or $S1C1-S2C2$ (lower side-band), this output signal being obtained as follows. To start with, the signals $x=(S1+C2)$ and $y=(S2+C1)$ are obtained by simple addition of S1 and C2 and of S2 and C1 as already explained, and then these two signals are applied to the circuit M. Assuming for the sake of convenience that the multiplying constant $k=1$, there will be obtained from the circuit M an output signal of the form represented by the expression:

$$z=xy=(S1+C2)(S2+C1)=(C1C2+S1S2)+(S1C1+S2C2)$$

The last two terms $(S1C1+S2C2)$ of the expression represent the upper side-band signal, but if the sign of only one of the signals or carrier oscillations S1, S2, C1 or C2 is changed (as by reversing the polarity thereof as applied to input terminals of the relevant combining circuit, or by reason of the latter phase-reversing it), then the expression $z$ becomes:

$$z=\pm(C1C2-S1S2)\pm(S1C1-S2C2)$$

where the signs in front of the brackets do not necessarily correspond, and the last two terms $(S1C1-S2C2)$ now represent the lower side-band signal.

The first two terms in both of the above expressions for $z$ correspond to unwanted signals which may have to be suppressed. This suppression can be achieved by comparatively simple filters (represented at F in FIG. 2) since the highest frequency of the signal represented by the term S1S2 is $2f_n$ and since the term C1C2 represents a single-frequency component of frequency $2f_0$. The filter, or filters, required would also have to suppress all frequencies below $2f_n$ and also the single-frequency $2f_0$, while providing a pass-band from $(f_0+f_1)$ to $(f_0+f_n)$ or from $(f_0-f_1)$ to $(f_0-f_n)$ according to which side-band is required as the output signal. So far as the suppression of the single frequency $2f_0$ is concerned this may be effected by a simple crystal filter circuit.

Reverting to the known quadrature modulation arrangement of FIG. 1, if the signal S1 is applied to modulator M2 instead of to modulator M1, while the signal S2 is applied to modulator M1 instead of to modulator M2, then the output (T1) from the modulator M1 will become:

$$T1=S2C1=C_0\sum_{k=1}^{k=n}\tfrac{1}{2}a_k\{-\cos[(\omega_0+\omega_k)t+\beta_k+\gamma_k]+\cos[(\omega_0-\omega_k)t-\beta_k-\gamma_k]\}$$

and the output (T2) from the modulator M2 will become:

$$T2=S1C2=C_0\sum_{k=1}^{k=n}\tfrac{1}{2}a_k\{\cos[(\omega_0+\omega_k)t+\beta_k+\gamma_k]+\cos[(\omega_0-\omega_k)t-\beta_k-\gamma_k]\}$$

Thus, as before, the output signals T1 and T2 contain both side-bands but in this instance their sum contains only the lower side-band, which may be represented by the expression $(S2C1+S1C2)$, and their difference contains only the upper side-band, which may be represented by the expression $(S2C1-S1C2)$.

In order to obtain corresponding side-band output signals with the arrangement of the invention shown in FIG. 2, the signal S1 would be combined with the carrier oscillation C1 in one of the combining circuits SP1 or SP2 to provide a signal $x=(S1+C1)$, while the signal S2 would be combined with the carrier oscillation C2 in the other combining circuit to provide a signal $y=(S2+C2)$. In this instance, therefore, the output signal $z$ obtained from the circuit M will be:

$$z=xy=(S1+C1)(S2+C2)=(C1C2+S1S2)+(S2C1+S1C2)$$

where the term (S2C1+S1C2) represents the lower side-band. Changing the sign of only one of the signals or carrier oscillations S1, S2, C1 and C2 will give, in the same manner as previously, the terms $\pm(S2C1-S1C2)$ which represent the upper side-band. It will be noted that the terms corresponding to unwanted signals, which may have to be suppressed, are the same as those present in the output signal $z$ which was obtained in the first example.

For both the known modulation arrangement shown in FIG. 1 and the modulation arrangement embodying the invention shown in FIG. 2, it has been stated that the carrier oscillation C2 is produced in quadrature with the carrier oscillation C by the single phase-shift network PC, as compared with the two phase-shift networks PS1 and PS2 which produce the in-quadrature signals S1 and S2 by phase-splitting the wide-band A.C. electric signal S. This would more usually be the case since, as is well known, only a relatively simple phase-shift network is needed to produce a 90° phase difference for a single frequency, but it is to be appreciated that two phase-shift networks could be used to produce the in-quadrature carrier oscillations C1 and C2: conversely, a single phase-shift network such as is described in United States Patent No. 2,726,368 or in "A Quadrature Network for Generating Vestigial-Sideband Signals," Proc. I.E.E., vol. 107, (May 1960), Part B at pp. 253–260, could be used for producing the wide-band in-quadrature signals S1 and S2. Where two phase-shift networks such as PS1 and PS2 are provided they may take the form described in "The Design of Wideband Phase Splitting Networks," Proc. I.R.E., July 1950, pp. 754–770 (W. Saraga), in "Realization of a Constant Phase Difference" (S. Darlington), Bell System Technical Journal 29, 1950, in "Synthesis of Wide-band Two-Phase Networks" (H. J. Orchard), Wireless Engineer 27, 1950, or in "Constant Phase Shift Networks" (R. O. Rowlands), Wireless Engineer 26, 1949.

Furthermore, although in the foregoing description in-quadrature signals (S1 and S2) and in-quadrature carrier oscillations (C1 and C1) have been assumed, it is well known that in phase-shift modulation arrangements a deviation from the phase difference of 90° between the two carrier oscillations can be compensated for by a corresponding deviation from the phase difference of 90° between the two signals; and vice versa. Such deviation is equally applicable in the case of the present invention as will now be demonstrated.

Consider once again the lower and upper side-band signal $(S1C1-S2C2)$ and $(S1C1+S2C2)$, one or the other of which is required to be produced by the arrangement of FIG. 2; in the ideal case in which the signals S1, S2 and the carrier oscillations C1 and C2 are in quadrature:

$$S1=\cos\omega_k t \qquad C1=\sin\omega_0 t$$
$$S2=\sin\omega_k t \qquad C2=\cos\omega_0 t$$

if, for the sake of simplicity, the signal S is assumed to a single frequency signal and its amplitude, and the amplitude of the carrier oscillation C, are assumed to be unity and the phase angles $\beta_k$ and $\gamma_k$ ignored (or assumed to be 0). Therefore, $$S1C1+S2C2=\sin(\omega_0+\omega_k)t$$

and $$S1C1-S2C2=\sin(\omega_0-\omega_k)t$$

Now, if only carrier oscillations of the form $$C1'=a_1\sin\omega_0 t \text{ and } C2'=a_2\cos(\omega_0 t+\delta)$$

are available, where $$\delta\neq\pm\frac{n\pi}{2}$$

(where $n$ is any integer including 0), the above side-band signals are still obtainable by arranging that $$a_1=a_2=\frac{1}{\cos\delta}$$

and S1 and S2 are replaced by $$S1'=\cos(\omega_k t\mp\delta)$$

and $$S2'=\sin\ {}_k t$$

where the negative sign (−) in the equation for S1' applies if the upper side-band is required and the positive sign (+) applies if the lower side-band is required. In this instance:

$$S1'C1'\pm S2'C2'=\frac{1}{\cos\delta}[\sin\omega_0 t\cos(\omega_k t\mp\delta)\pm\cos(\omega_0 t+\delta)\sin\omega_k t]$$
$$=\frac{1}{\cos\delta}[\sin\omega_0 t(\cos\omega_k t\cos\delta\pm\sin\omega_k t\sin\delta)\pm\cos\omega_0 t\cos\delta\sin\omega_k t\mp\sin\omega_0 t\sin\delta\sin\omega_k t$$

Thus $$S1'C1'\pm S2'C2'=\sin\omega_0 t\cos\omega_k t\pm\cos\omega_0 t\sin\omega_k t=\sin(\omega_0 t\pm\omega_k)t$$

as required.

The above explanation also applies, of course, to known phase-shift modulations arrangements.

Figure 3:
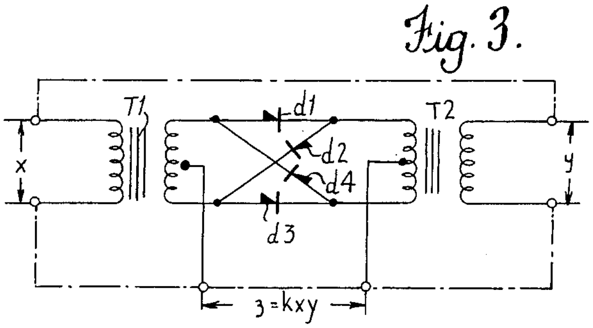
FIG. 3 is a circuit of a so-called "symmetrical multiplier" suitable for use in the arrangement of the invention.

A symmetrical multiplier circuit which is suitable for use as the circuit M in FIG. 2 is shown in FIG. 3. This multiplier circuit is essentially a diode-ring circuit comprising four diodes $d1$ to $d4$, but the circuit has been drawn in lattice form in order to illustrate its symmetry. Ideally, the diodes $d1$ to $d4$ should all be identical and this condition may be approached by careful selection of the diodes. In operation of the circuit, input signals $x$ and $y$ applied to the diode-ring by way of input transformers T1 and T2 respectively result in a product signal $z=kxy$ being produced from the centre taps of the transformer secondary windings. A full description of such a diode-ring circuit used as a four-quadrant multiplier is given in "Review of Scientific Instruments," November 1959 at pages 1009–1011. Any other type of symmetrical multiplier circuit may also be used for the invention, another example being an electron-beam tube as may be used for four-quadrant multiplication. A description of an electron-beam tube used in this fashion is given in "Review of Scientific Instruments," March 1954, at pages 280–294.

It is also envisaged that a "symmetrical multiplier" circuit as required for carrying out the invention may compromise one or two Hall multipliers. In the interests of economy, and from the point of view of stability, a single Hall multiplier would be preferable, but it might not meet the requirements for a symmetrical multiplier because on the one hand its plate input impedance is relatively low and independent of frequency, whereas on the other hand its coil input impedance is much higher and, moreover, increases with increase in frequency so that with constant voltage applied to the coil input the magnetic field produced by its coil circuit would decrease as the frequency increases. However, this difficulty in the coil input could be overcome in known manner by appropriate "buffering" by means of pads or amplifying means to obtain a constant input impedance, or by feeding the coil input from a constant current device such as a pentode valve or a common base transistor: the difficulty could also be overcome by providing at either the coil or the plate input, or at both these inputs, amplitude and phase equalizing circuits which render the multiplier symmetrical with or without buffering or constant current feed at its coil input.

Figure 4:
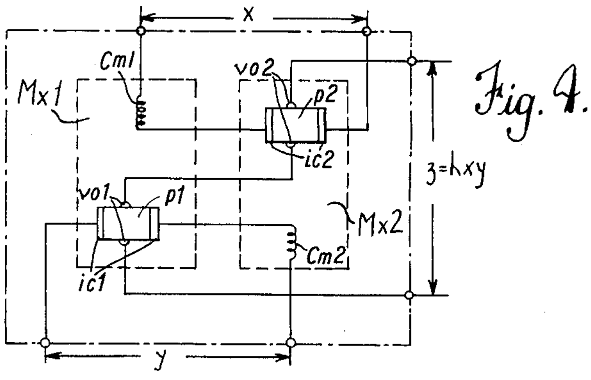
FIG. 4 is a circuit of a possible alternative form of symmetrical multiplier.

The symmetrical multiplier circuit illustrated in FIG. 4 comprises two substantially similar Hall multipliers M$x$1 and M$x$2 which have respective magnetizing coils C$m$1 and C$m$2 and respective Hall plates $p$1 and $p$2. The two Hall plates $p$1 and $p$2 have respective pairs of current input electrodes $ic$1 and $ic$2 and respective pairs of voltage output electrodes $vo$1 and $vo$2. With regard to each Hall plate, the pair of current input electrodes is positioned along a line at right angles to a line through the pair of voltage output electrodes, these two lines being mutually at right angles to a magnetic field to which the Hall plate is subjected on energization of the magnetizing coil of the relevant Hall multiplier. In well known manner, each of the two Hall multipliers M$x$1 and M$x$2 is operable to produce at its output electrode pair, by virtue of the Hall effect, a Hall voltage output signal which is the product of two input signals applied respectively to the magnetizing coil and to the pair of input electrodes of the Hall multiplier. In order for the multiplier circuit to achieve symmetrical multiplication, the two Hall multipliers have their coil and plate input circuits cross-connected in series as indicated, whereby to form two resulting input circuits having similar input impedance and frequency characteristics. Thus an input signal $x$ applied to the symmetrical multiplier circuit energizes the magnetizing coil C$m$1 to produce a magnetic field for the multiplier M$x$1 and sets up current flow between the input electrode pair $ic$2 of the Hall plate $p$2 of multiplier M$x$2 while another input signal $y$ applied to the symmetrical multiplier energizes the coil C$m$2 to produce the magnetic field for the multiplier M$x$2 and sets up current flow between the electrode pair $ic$1 in the plate $p$1 of multiplier M$x$1. In response to these two inputs signals $x$ and $y$ the two Hall multipliers M$x$1 and M$x$2 produce respective Hall output voltage signals which, by virtue of the fact that the Hall output electrode pairs $vo$1 and $vo$2 of the two Hall plates are connected in series, are combined so that a product signal $z=kxy$ is produced by the symmetrical multiplier circuit. The principle of cross-connecting the input circuits of the two Hall multipliers in order to form, for the symmetrical multiplier as a whole, resulting input circuits presenting similar impedances and frequency characteristics to input signals, can be applied to other types of asymmetrical multipliers thereby enabling them to be used in pairs as a single unit for the purposes of the invention. It is to be appreciated that the individual input circuits of asymmetrical multipliers could equally well be connected in parallel or in any other suitable way provided that the two resulting input circuits are substantially similar.

Although generation of only a single side-band has been considered in the foregoing description, it is possible to employ the phase-shift method for simultaneous generation of a two-channel signal comprising upper and lower side-bands which convey different intelligence. Such two-channel operation is very attractive in practice because it affords generation of two independent side-bands by a single phase-shifting and modulating arrangement, and the manner in which it is achieved in respect of the known phase-shift modulation arrangement shown in FIG. 1 is described in detail in "The phase-shift method of single side-band signal generation," Proc. I.R.E., vol. 44, No. 12, December 1956, p. 1718.

Two-channel operation may be correspondingly achieved by a phase-shift modulation arrangement conforming to the invention. More specifically, in the case of single side-band generation, the upper side-band or the lower side-band is obtained (as already described) depending on the polarity of the signals and carrier oscillators S1, S2, C1 and C2. For instance, the application to the combining circuits SP1 and SP2 of +S1 and −S2, or −S1 and +S2 (instead of +S1 and +S2) would result in an interchange of the upper and lower side-bands. Therefore, if in addition to the signals S1 and S2, a second independent signal S′ is also applied to the combining circuits SP1 and SP2 as signals +S′1 and −S′2, or −S′1 and +S′2, it is evident that there will be obtained at the output of the modulation arrangement one type of side-band (upper or lower) for the signal S and the opposite side-band for the signal S′. Conveniently, these signals +S′1 and −S′2, or −S′1 and +S′2 may be produced by applying the signal S′ directly to one of the phase-shift networks PS1 or PS2 and in anti-phase (i.e. with 180° phase difference) to the other, whereas the original signal S is applied in the same phase to both networks. This utilises the networks PS1 and PS2 for both signals but, as an alternative, separate phase-shift networks could be provided for the signal S′ if desired.

What I claim is:

1. A modulation circuit arrangement comprising a first combining circuit connected to receive a carrier oscillation signal and an alternating current signal to be frequency translated and operable to produce a first combination signal composed of said carrier oscillation signal and alternating current signal;

a second combining circuit connected to receive said carrier oscillation signal and said alternating current signal each phase displaced with respect to the corresponding signal as received by the first combining circuit, said second combining circuit being operable to produce a second combination signal composed of said carrier oscillation signal and alternating current signal; phase shifting means for giving to said alternating current signal as received by the two combining circuits and also to the carrier oscillation signal as received thereby a selected phase difference;

and multiplying means connected to receive said first and second combination signals and operable to multiply them together, the amplitudes and phase differences of said carrier oscillation signal and alternating current signal giving a resultant output signal from the multiplying means containing frequency components corresponding to frequencies of one side-band of the modulation product of said carrier oscillation signal and said alternating current signal.

2. A modulation circuit arrangement as claimed in claim 1, said phase-shifting means giving to said alternating current signal as received by the two combining circuits and also to the carrier oscillation signal as received thereby, phase differences of approximately 90°.

3. A modulation circuit arrangement as claimed in claim 1 wherein said multiplying means is a diode-ring type symmetrical multiplier circuit.

4. A modulation circuit arrangement as claimed in claim 1 wherein said multiplying means comprises two substantially similar Hall multipliers each having a coil input circuit and a plate input circuit of which the plate input circuit of each multiplier is cross-connected with the coil input circuit of the other multiplier whereby to form for said multiplying means, for receiving said first and second combination signals, two resulting input circuits having similar input impedances and frequency characteristics.

5. A modulation circuit arrangement comprising a first combining circuit connected to receive a carrier oscillation signal and an alternating current signal to be frequency translated and operable to produce a first combination signal composed of said carrier oscillation signal and alternating current signal;

a second combining circuit connected to receive said carrier oscillation signal and said alternating current signal each phase displaced by approximately 90° with respect to the corresponding signal as received by said first combining circuit, said second combining circuit being operable to produce a second combination signal composed of said carrier oscillation signal and alternating current signal;

phase-shifting means for giving to said alternating current signal as received by the two combining circuits and also to the carrier oscillation signal as received thereby, the phase differences of approximately 90°;

and a diode-ring type symmetrical multiplier circuit connected to receive said first and second combination signals and to multiply them together whereby to produce a resultant output signal containing frequency components corresponding to frequencies of one side-band of the modulation product of said carrier oscillation and said alternating current signal.

6. A modulation circuit arrangement comprising a first combining circuit connected to receive a carrier oscillation signal and an alternating current signal to be frequency translated and operable to produce a first combination signal composed of said carrier oscillation signal and alternating current signal;

a second combining circuit connected to receive said carrier oscillation signal and said alternating current signal each phase displaced by approximately 90° with respect to the corresponding signal as received by said first combining circuit, said second combining circuit being operable to produce a second combination signal composed of said carrier oscillation signal and alternating current signal;

phase-shifting means for giving to said alternating current signal as received by the two combining circuits and also to the carrier oscillation signal as received thereby, the phase differences of approximately 90°;

and multiplying means comprising two substantially similar Hall multipliers each having a coil input circuit and a plate input circuit of which, the plate input circuit of each multiplier is cross-connected with the coil input circuit of the other multiplier whereby to form for said multiplying means two resulting input circuits having similar input impedances and frequency characteristics, which multiplying means is connected to receive said first and second combination signals respectively at said two resulting input circuits and is operable to multiply these combination signals together to produce a resultant output signal containing frequency components corresponding to frequencies of one side-band of the modulation product of said carrier oscillation and said alternating current signal.

References Cited by the Examiner

UNITED STATES PATENTS

| | | | |
|---|---|---|---|
| 2,600,226 | 6/1952 | Ensink | 332—44 X |
| 3,029,396 | 4/1962 | Sichok | 332—47 X |
| 3,050,698 | 8/1962 | Brass | 332—47 |

ROY LAKE, *Primary Examiner.*

JOHN KOMINSKI, *Examiner.*